(12) United States Patent
Lin et al.

(10) Patent No.: US 6,499,082 B1
(45) Date of Patent: Dec. 24, 2002

(54) METHOD OF TRANSFERRING DATA FROM LARGE CAPACITY DATA STORAGE DEVICE

(75) Inventors: Kun-Long Lin, Taipei Hsien (TW); Wei-Ming Su, Taipei (TW); Pei-Jei Hu, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/394,310

(22) Filed: Sep. 10, 1999

(30) Foreign Application Priority Data

Apr. 16, 1999 (TW) ........................................ 88106099 A

(51) Int. Cl.[7] .............................................. G06F 12/00
(52) U.S. Cl. ............................ 711/112; 710/52; 714/7; 714/8; 714/48; 714/768
(58) Field of Search ........................... 711/112; 710/52; 714/48, 768, 7–8

(56) References Cited

U.S. PATENT DOCUMENTS 5,848,076 A * 12/1998 Yoshimura ................. 714/763
6,009,547 A * 12/1999 Jaquette et al. ............. 714/758

OTHER PUBLICATIONS

Semiconductor Memories, Betty Prince and Gunnar Due-Gundersen, 1983, John Wiley and sons LTD.*

* cited by examiner

Primary Examiner—Do Hyun Yoo
Assistant Examiner—Mehdi Namazi
(74) Attorney, Agent, or Firm—J.C. Patents

(57) ABSTRACT

A method for transferring data from a large capacity data storage device to a host machine. The method requires the attachment of a plurality of SRAM memory blocks to an optical disk reader. Each SRAM memory block is used as temporary storage area got a sector of data so that data can be proofread one sector at a time. As soon as the entire sector is checked and corrected, the error-free data is transferred to an external DRAM memory. Thereafter, correct data can be read from the DRAM by the host machine at any time. The internal SRAM memory serves as a buffer holding sectors of data so that error detection and error correction of individual sector can be carried out. Additionally, the external DRAM memory serves as a buffer holding the correct data for the host machine.

20 Claims, 5 Drawing Sheets

METHOD OF TRANSFERRING DATA FROM LARGE CAPACITY DATA STORAGE DEVICE

CROSS-REFERENCE TO RELATED APPLICATION

This application claims the priority benefit of Taiwan application serial no. 88106099, filed Apr. 16, 1999, the full disclosure of which is incorporated herein by reference.

BACKGROUND OF THE INVENTION

1. Field of Invention

The present invention relates to a method of reading data from a large capacity data storage device. More particularly, the present invention relates to a method of transferring checked and corrected data from a large capacity data storage device to a host machine.

2. Description of Related Art

An optical disk is a storage medium that can register vast amounts of data. In general, an optical disk is divided into many basic storage units known as sectors or blocks. Besides storing actual data, each sector of an optical disk also registers some control data, error detection code (ETC.) AND error correction code (ECC). Before data is read from each sector by a computer system, error detection and correction of the sector data need to be carried out using the error detection code and the error correction code stored within the sector itself. Sector data should be read by a host system only when the sector data is error-free.

FIGS. 1A through 1C are a sequence of steps showing conventional error detection and error correction activities before data is read from an optical disk. In conventional technology, data in each optical disk sector are first read out and temporarily stored in an external DRAM 100 (outside the optical disk control unit). The host machine reads those data from the DRAM 100 only when the data are checked and shown to be error-free using the error detection code and the error correction code. The process of error detection and correction demands that the host machine divide the external DRAM 100 into several blocks such as 100*a*, 100*b* and 100*c* each of the same size according to the optical disk format. By configuring the external memory 100 into a suitable data format, the error detection code and the error correction code can be easily found. The DRAM 100 contains a buffer pointer (buff_ptr) that points to the address of the next available slot for storing a new sector of data. When the host machine starts to read data sector-by-sector from a CD/DVD-ROM disk through an optical disk system, sector data S0 and S1 are stored in the contiguous blocks 100*a* and 100*b* of the DRAM 100 according to the address indicated by the buffer pointer buff_ptr. Once sector data such as S1 are stored in memory block 100*b*, error detection and error correction for the sector data S0 can begin according to the error detection code and error correction code within the sector data S0. As soon as data detection and data correction of the sector data S0 is finished, the correct sector data are available for the host machine. Similarly, other sector data from the optical disk must go through the aforementioned process using a pipeline operation.

However, a portion of the external memory space (DRAM 100) is needed just to hold the sector data temporarily so that error detection and error correction can be carried out. Therefore, the operating bandwidth of the external memory is likely to be reduced resulting in lower system efficiency.

In addition, each sector data to be read must go through the above pipeline operation. When some of the sector data requires longer period for error detection and correction, further deterioration of DRAM's working efficiency may occur, leading to a slowdown of reading operation. Furthermore, optical disk systems having ever-increasing speed are now being developed. Thus, the current frequency bandwidth of external DRAM may not be wide enough to provide the necessary capacity for detecting and correcting each sector data. Hence, error detection and correction capacity will be severely restricted in the future.

In light of the foregoing, there is a need to provide a method for transferring correct data from a large capacity data storage device to a host machine.

SUMMARY OF THE INVENTION

Accordingly, the purpose of the present invention is to provide a method of transferring data from a large capacity data storage device. The method includes adding some memory space inside the device for dealing with error detection and correction of sector data. Therefore, error detection and correction of data no longer has to be conducted inside system DRAM, and workload of system DRAM is reduced.

In another aspect, the invention provides a method for transferring data from a large capacity data storage device. The method includes adding some memory space inside the device for dealing with error detection and correction of sector data. Since additional memory for error detection and correction activities is reserved inside the device, the rate of error detection and correction is increased.

One further aspect of the invention is to provide method of transferring data from a large capacity data storage device. The method includes adding some memory space inside the device for dealing with error detection and correction of sector data. Since additional memory for error detection and correction activities is reserved inside the device, a faster optical disk system can be accommodated by a host machine.

To achieve these and other advantages and in accordance with the purpose of the invention, as embodied and broadly described herein, the invention provides a method of transferring data from a large capacity data storage device to a host machine. The method includes reading a plurality of sector data from a storage medium into the large capacity data storage device. Then, the data from various data sectors are stored in contiguous address space inside a first memory, where the first memory resides in the control system of the large capacity data storage device. Next, error detection and error correction of the data inside the first memory are carried out in sequence, a sector of data at a time. After error detection and correction from a particular data sector is finished, the correct data is transferred to a second memory. The second memory is an independent storage medium outside the large capacity storage device control system. Finally, the host machine can read correct data from the second memory.

Capacity of the first memory depends on the amount of error detection and error correction inside the large capacity storage device. In addition, because the first memory is used for error detection and error correction, a faster operating type of memory such as the static random access memory (SRAM) can be used. Additionally, since the second memory is the host memory, dynamic random access memory (DRAM) can be used.

Furthermore, the invention also provides a control system for controlling the transfer of data between a large capacity data storage device and a host machine. The control system of the large capacity data storage device includes a control unit for controlling the large capacity data storage device; an internal memory having a plurality of memory blocks for storing several sectors of data read out by the large capacity data storage device from a data storage medium; an error detection and correction circuit coupled to the internal memory for detecting and correcting various data errors inside each memory block, wherein the correct data are immediately transferred to the host memory; and a microprocessor coupled to the error detection and correction circuit, the control unit and the internal memory via a bus channel, where the microprocessor is used for controlling the control unit. The internal memory can be SRAM and the capacity of the internal memory can be designed to fit the operational requirements of error detection and correction. The system memory can be DRAM.

The SRAM internal memory is a buffer for carrying out the necessary proofreading operations of each data sector, whereas the DRAM system memory is just a buffer for holding the corrected data. Therefore, error detection and correction of the data in each sector does not increase the memory occupancy of the DRAM. Furthermore, by employing faster SRAM memory inside the large capacity storage device, the speed of error detection and correction can be increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
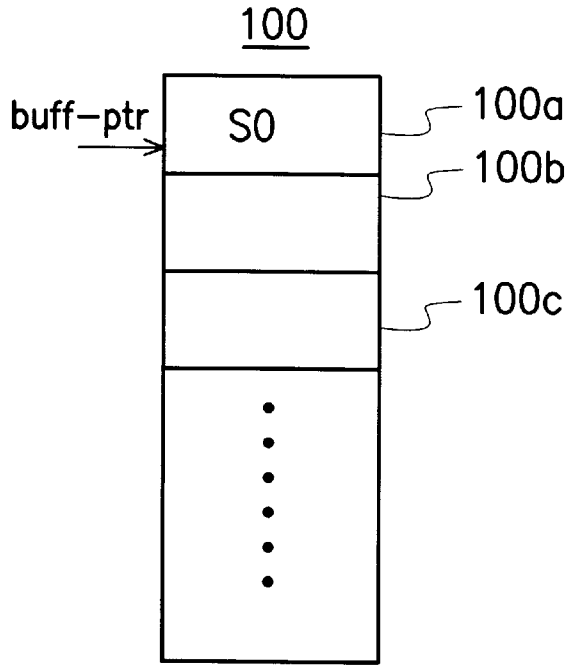
FIGS. 1A through 1C are a sequence of steps showing conventional error detection and error correction activities before data is read from an optical disk.
Figure 1B:
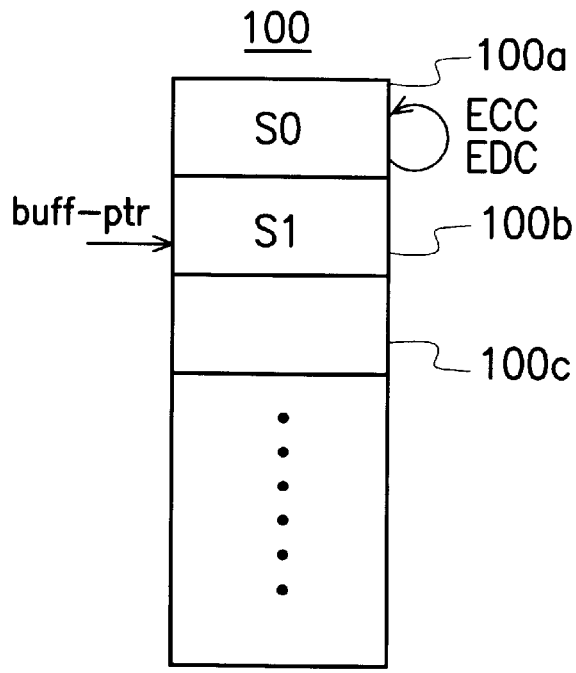
Figure 1C:
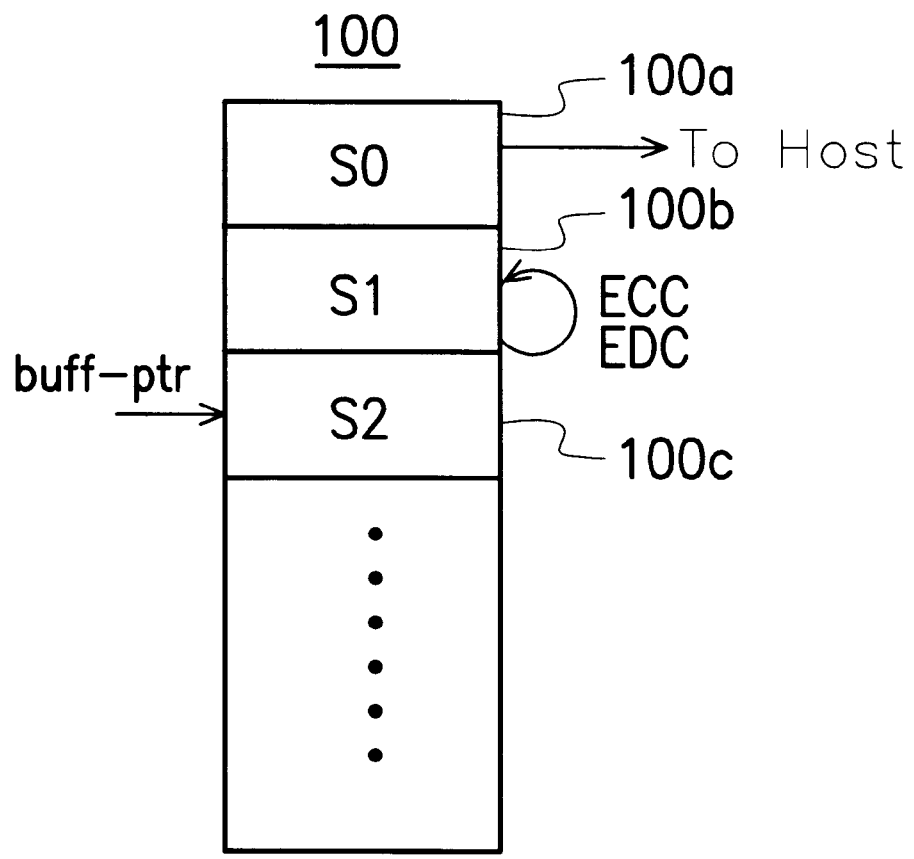

Reference now be made in detail to the present preferred embodiments of the invention, examples of which are illustrated in the accompanying drawings. Wherever possible, the same reference numbers are used in the drawings and the description to refer to the same or like parts.

This invention provides a method for transferring data from a large capacity data storage device. The method includes setting aside a plurality of SRAM memory blocks in an optical disk system. Size of the SRAM memory is configured in such a way that error correction code (ECC) or error detection code (EDC) can be easily processed. When a sector of data is read from an optical disk medium into SRAM, sector data from a previous cycle is proofread. After the complete proofreading of the sector data, the correct data is transferred to an external DRAM memory for storage. Once the external DRAM memory receives the correct sector data, the sector data is passed onto a host machine.

Figures 2A, 2B:
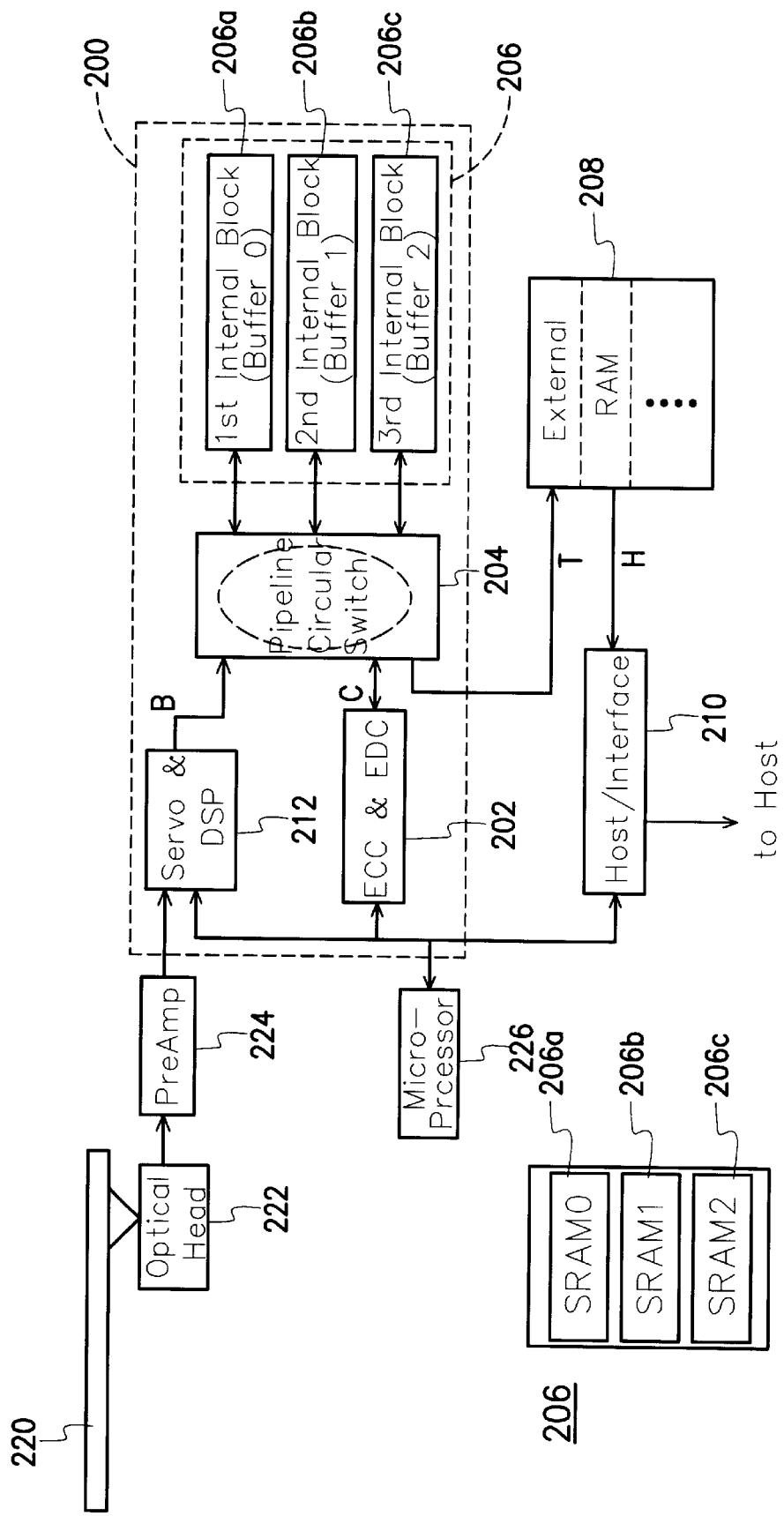
FIG. 2A is a block diagram showing the circuit layout for transferring data from a large capacity data storage device to a host machine according to one embodiment of this invention.
FIG. 2B is a diagram showing the internal configuration of the internal memory as shown in FIG. 2A.

FIG. 2A is a block diagram showing the circuit layout for transferring data from a large capacity data storage device to a host machine according to one embodiment of this invention. As shown in FIG. 2A, the large capacity storage device 200 is capable of reading data from an optical recording medium or a hard drive. However, an optical disk reader is chosen as an example in the embodiment. The optical system equips with an optical head 222, and hence various optical recording media such as CD, CD-ROM, VCD or DVD are amenable to the system.

The optical head 222 is controlled by a control unit 200. The control unit 200 at least includes a pipeline circular switch 204, a servo and digital signal processor (DSP) 212, an internal memory 206 and an error detection and error correction (EDC & ECC)circuit 202.

As shown in FIG. 2A, the internal memory is coupled to the pipeline circular switch 204 and has a plurality of memory blocks, such as 206a, 206b and 206c. A faster type of memory such as SRAM can be used in the internal memory 206. The internal memory 206 is a temporary storage area for the sector data from an optical disk so that the error detection and correction circuit 220e can be used for detecting and correcting any data errors. The memory blocks 206a, 206b and 206c can be separated. Furthermore, the sizes of the memory blocks 206a, 206b and 206c can be designed according to the demand of the EDC and ECC procedure.

Under the control of the pipeline circular switch 204, the memory blocks 206a, 206b and 206s are used to, in a manner of pipeline, temporally store a plurality of sector data which are read through the digital signal processor (DSP) 212 by the optical head 222. The ECC and EDC circuit 202 couples to the pipeline circular switch 204 and perform the EDC and ECC procedure in the manner of pipeline to the sector data stored in the memory blocks 206a, 206b and 206c under the control of the pipeline circular switch 204.

When the EDC and ECC procedure of each sector data is performed, the correct sector data are sequentially transferred to an external memory 208 which is exterior to the control unit 200 under the control of the pipeline circular switch 204, thereby the host can read the correct sector data from the external memory 208 through a host interface 210. The external memory 208 can preferably use dynamic random access memory (DRAM).

FIG. 2B is a diagram showing the internal configuration of the internal memory 206 as shown in FIG. 2A. As shown in FIG. 2B, the memory 206 is divided into three separate blocks SRAM0, SRAM1 and SRAM2. Size of each memory block is designed in such a way that their capacities are suitable for error detection and error correction as well as pipeline operation. Due to the presence of internal memory 206 inside the control unit 200, error detection and correction rate of sector data from an optical disk is greatly increased. Moreover, the loading of the DRAM memory is also greatly reduced due to a partial transfer of workload.

After the sector data inside the internal memory SRAM 206 has gone through error detection and error correction procedures, the correct sector data is transferred to external memory 208. External memory 208 refers to memory that is outside the control unit 200, and in particular, a memory that is independent from the internal memory 206. In fact, the external memory 208 can be part of the memory in the host machine. Moreover, the external memory 208 can be DRAM. The correct sector data is written into the DRAM memory 208 under control of a system controller and a memory controller. Finally, the host machine can read correct sector data from the optical disk through the DRAM memory 208.

In brief, the internal SRAM memory 206 of this invention is used to store sector data read from an optical disk 220. Next, error detection and correction of the sector data in the SRAM memory 206 is performed. Thereafter, the correct sector data is written to the DRAM memory 208 for the host machine to retrieve. The internal SRAM memory 206 is a place reserved for error detection and correction only. Therefore, the error detection and correction rate can be increased. The external DRAM memory 208 is a place reserved for storing correct data for the host machine only. Hence, the reduction of operating bandwidth for a DRAM memory 208 due to the error detection and correction activities inside a conventional system can be avoided. In addition, the loading of the DRAM memory can be reduced.

Figure 3:
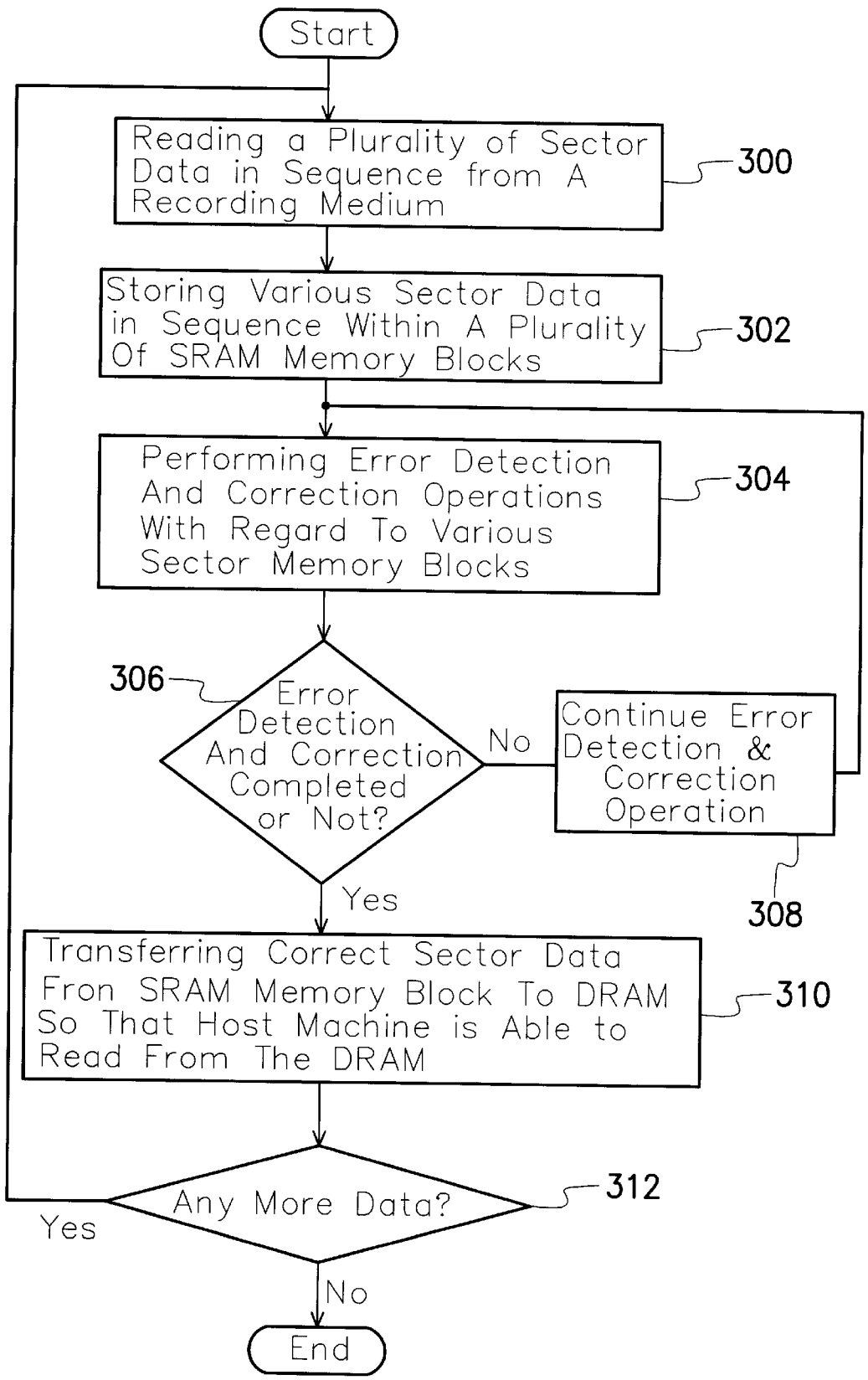
FIG. 3 is a flow chart showing the steps in transferring data from the large capacity data storage device to a host machine according to this invention.

FIG. 3 is a flow chart showing the steps for transferring data from the large capacity data storage device to a host machine according to this invention. As shown in FIG. 3, data from a number of sectors such as S0, S1 and S2 are read in sequential order from an optical disk into the large capacity storage device 200 in step 300. Next, the sector data S0, S1 and S2 are stored in a number of contiguous locations inside a first memory in step 302. In other words, the sector data S0, S1 and S2 are stored inside locations SRAM0, SRAM1 and SRAM2 of the SRAM memory 206 respectively. Thereafter, in step 304, error detection and error correction procedures are carried to check and correct sequentially the errors in each of the sector data S0, S1 and S2 inside the SRAM memory 206. Error detection and error correction procedures are carried out using the error detection and correction circuit 202. Note that each memory block such as SRAM0, SRAM1 and SRAM2 inside the SRAM memory 206 is responsible for the error detection and correction of a single sector of data only.

Step 306 is a conditional statement. Therefore, if error detection and correction of the data in one of the sectors such as S0 is finished, step 310 is carried out by sending the correct data to the external DRAM memory 208. On the other hand, if error detection and correction operations are not finished, the operation in step 304 is continued. Ultimately, the host machine is able to read all the correct sector data from the DRAM memory 208. Finally, in step 312, if some more data need to be read from the optical disk, the operations from steps 300 to 310 are repeated by going back to step 300 again.

Figure 4A:
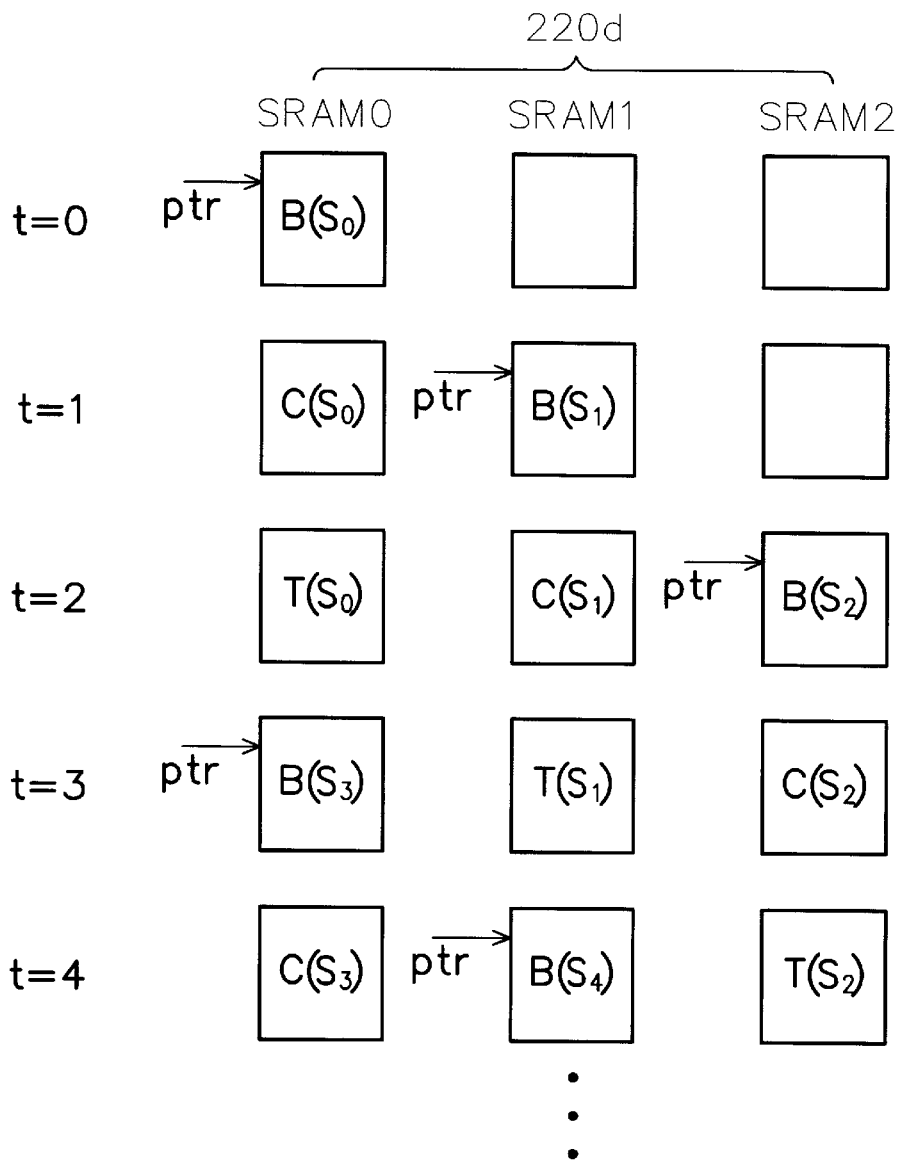
FIGS. 4A and 4B are timing diagrams showing the sequence of events in the process of transferring data from the large capacity data storage device to a host machine according to this invention.
Figure 4B:
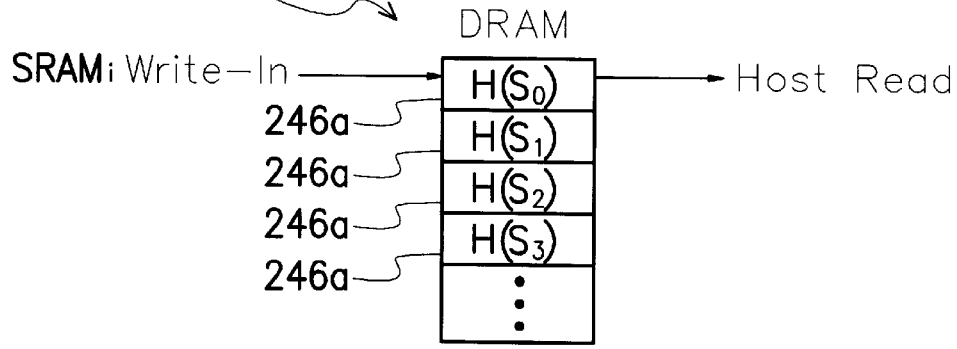

FIGS. 4A and 4B are used to better illustrate the operation of the large capacity storage device. FIGS. 4A and 4B are timing diagrams showing the sequence of events in the process of transferring data from the large capacity data storage device to a host machine according to this invention. In FIG. 4A, B symbolizes the action of storing data in the SRAM memory 220d temporarily; C symbolizes the activities of detecting and correcting errors of the stored data inside the SRAM memory 220d; and T symbolizes the transmission of correct data to the external DRAM memory 246. In FIG. 4B, H symbolizes the reading of correct data by the host machine.

First, as shown in FIG. 4A, at time t0 (referring to sector time), data S0 is read out from an optical disk and temporarily stored in a first location SRAM0 according to the pointer ptr. Thereafter, the pointer ptr points to a second location SRAM1.

At time t1, data S1 is read out from an optical disk and temporarily stored in the second location SRAM1 according to the pointer ptr. In the meantime, error detection and correction of the data S0 residing in location SRAM0 is carried out. Similarly, the pointer ptr points to a third location SRAM2 thereafter.

At time t2, data S2 is read out from an optical disk and temporarily stored in the third location SRAM2 according to the pointer ptr. In the meantime, error detection and correction of the data S1 residing in location SRAM1 is carried out, and the correct data S0 in SRAM0 is transmitted to the external DRAM memory 246. Next, the pointer ptr points back to the first location SRAM0 again.

At time t3, data S3 is read out from an optical disk and temporarily stored in the first location SRAM0 according to the pointer ptr. In the meantime, error detection and correction of the data S2 residing in location SRAM2 is carried out, and the correct data S1 in SRAM1 is transmitted to the external DRAM memory 246. Next, the pointer ptr points to the second location SRAM1 again.

At time t4, data S4 is read out from an optical disk and temporarily stored in the first location SRAM1 according to the pointer ptr. In the meantime, error detection and correction of the data S3 residing in location SRAM0 is carried out, and the correct data S2 in SRAM2 is transmitted to the external DRAM memory 246. Next, the pointer ptr points to the third location SRAM2 again.

In this way, a pipeline operation is set up that includes the transfer of data into the SRAM memory 220d, the detection and correction of errors and the transmission of correct data to external DRAM memory 246, which are all conducted concurrently.

After the correct data is stored inside the external DRAM memory 246, the host machine can read the data whenever it wants.

By repeating the above operations, sector data on an optical disk can be transferred to the internal SRAM memory 220d for error detection and correction sequentially. Thereafter, the correct sector data is transferred to the external DRAM memory 246 so that the correct data can be read by the host machine at any time.

In short, the characteristics of this invention include the installation of several SRAM memory blocks inside an optical disk reader. Each of the memory blocks is able to hold and proofread the data in one sector only. As soon as the sector data is corrected, it is transferred to external DRAM memory for storage. Thereafter, a host machine is able to read from DRAM the correct sector data. In this invention, each internal SRAM memory block serves as a buffer for holding one sector of data so that error detection and correction can be carried out. The external DRAM memory serves as another buffer for holding the correct sector data so that a host machine can read. Consequently, data detection and correction activities do not affect the operating bandwidth of the DRAM. In addition, faster operating SRAM can be used to speed up the rate of data detection and correction.

A second characteristic of this invention is the reduction of DRAM's workload and the setting aside of more time for the proofreading of data. Hence, reading data from an optical medium is more efficient.

It is apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of transferring data from a large capacity data storage device to a host machine, comprising the steps of:

reading a plurality of sector data from the large capacity data storage device and then storing the sector data into a plurality of first memory blocks, wherein the first memory blocks are coupled to a control system of the large capacity data storage device;

performing error detection and error correction operations on the sector data residing in the first memory blocks;

transferring the correct sector data to a second memory as soon as the detection and correction of data errors are finished, wherein the second memory is an independent memory outside the control system of the large capacity data storage device; and transferring the correct sector data from the second memory to the host machine.

2. The method of claim 1, wherein the size of each first memory block is designed according to the needed capacity for carrying out error detection and correction.

3. The method of claim 1, wherein the first memory blocks include static random access memory (SRAM).

4. The method of claim 1, wherein the second memory includes host machine memory.

5. The method of claim 4, wherein the host machine memory includes dynamic random access (DRAM).

6. The method of claim 1, wherein the control system of the large capacity data storage device includes the control system of an optical recording medium.

7. A method of transferring data from a large capacity data storage device to a host machine, comprising the steps of:

reading a sector of data from the large capacity data storage device and then storing the sector data into a first memory blocks;

detecting and correcting errors in the sector of data inside the first memory blocks;

transferring the correct sector of data to a second memory as soon as error detection and correction is finished, and simultaneously reading another sector of data from the large capacity data storage device and then storing the sector of data into the first memory blocks again; and transferring the correct sector of data from the second memory to the host machine.

8. The method of claim 7, wherein the size of each first memory block is designed according to the needed capacity for carrying out error detection and correction.

9. The method of claim 7, wherein the first memory block include static random access memory (SRAM).

10. The method of claim 7, wherein the second memory includes host machine memory.

11. The method of claim 10, wherein the host machine memory includes dynamic random access (DRAM).

12. The method of claim 7, wherein a control system of the large capacity data storage device includes the control system of an optical recording medium.

13. The method of claim 7, wherein the first memory blocks and the second memory are mutually independent.

14. A control unit for controlling the transfer of data from a large capacity data storage device to a host machine, comprising:

pipeline circular switch;

a servo and digital signal process circuit coupled to the pipeline circular switch;

an internal memory coupled to the pipeline circular switch and having a plurality of memory blocks for storing the sector data which read from the large capacity data storage device in a manner of pipeline under the control of the pipeline circular switch; and an error detection and correction circuit coupled to pipeline circular switch and sequentially performing an EDC (error detection code) and ECC (error correction code) procedure to the sector data stored in the memory blocks, when the EDC and ECC procedure of each sector data is performed, the correct sector data are sequentially transferred to an external memory which is exterior to the control unit under the control of the pipeline circular switch, thereby the machine can read the correct sector data from the external memory through a host interface.

15. The control unit of claim 14, wherein the internal memory includes static random access memory (SRAM).

16. The control unit of claim 14, wherein the memory blocks are separated from one another.

17. The control unit of claim 14, wherein the size of each memory block is designed according to the needed capacity for carrying out error detection and correction.

18. The control unit of claim 14, wherein each memory block is responsible for the error detection and correction of one single sector of data only.

19. The control unit of claim 14, wherein the host machine includes dynamic random access memory (DRAM).

20. The control unit of claim 14, wherein a control system of the large capacity data storage device includes the control system of an optical recording medium.

* * * * *